April 24, 1928.

S. A. SLAUSON

TAKE-UP DEVICE

Filed June 20, 1925

Inventor:
Stephen A. Slauson
By Wm. O. Belt
Atty.

Patented Apr. 24, 1928.

1,666,949

UNITED STATES PATENT OFFICE.

STEPHEN A. SLAUSON, OF CEDAR RAPIDS, IOWA, ASSIGNOR TO VEC PRODUCTS COMPANY, OF CEDAR RAPIDS, IOWA, A CORPORATION OF IOWA.

TAKE-UP DEVICE.

Application filed June 20, 1925. Serial No. 38,483.

The device forming the subject matter of this application is an improvement on that described and claimed in my copending application, Serial No. 6,167 filed February 2, 1925, and has for its principal object to provide an improved construction, which is more easily made and which shall be of more rugged character. This object I achieve by providing novel and improved means on the lock nut for adjusting the spring which tensions the main nut, instead of providing such means on the main nut. The lock nut is stouter than the main nut due to the depth of the flange thereon and I provide a groove in the shoulder formed by this flange which groove is intercepted by a plurality of recesses extending inwardly from the edge of the flange and each forming means for engaging with the hooked end of the spring.

A further object is to provide a means on the nut for engagement with the hooked end of the spring of the take-up device and of such a character that the end of the spring is not twisted when it is engaged with the nut and of such a character that the hooked end of the spring cannot become displaced by lateral movement.

A still further object is to provide a novel and improved take-up device embodying a lock nut, which shall have all of the above described characteristics and which yet shall not exceed the size of a standard nut.

In the accompanying drawing in which I have shown a selected embodiment of my invention:

Figure 1:
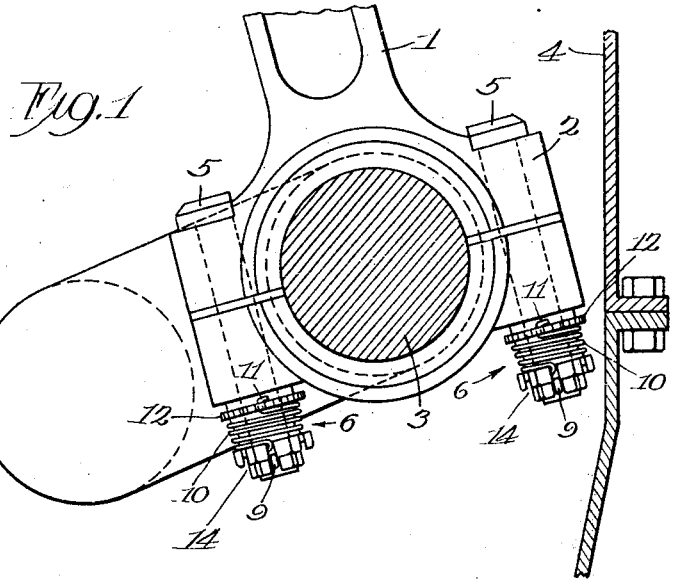
Fig. 1 is a view showing my invention as applied to the bearing by means of which the connecting rod of an engine is attached to the crank shaft.

Referring now to the drawings, I have shown at 1 a connecting rod of an automobile engine which is connected by the split bearing 2 to a crank shaft 3, all of which is enclosed within the crank casing 4. The split bearing is held in position on the crank shaft by means of a plurality of bolts 5 usually arranged in pairs, one bolt on either side of the connecting rod. These bolts are held in position by take-up devices indicated generally at 6 (Fig. 1).

The aforesaid take-up devices comprise main nuts 7 and lock nuts 8 telescoping with the main nuts. The lock nut is castellated and secured to the bolt upon which it is threaded by means of a suitable cotter pin 9 and a spring 10 is coiled about the two nuts having one end 11 passing through the flange 12 of the main nut and bent over to secure it thereto. The other end of the spring is formed into a hook 13, which is adapted to be engaged with any one of a number of means on the lock nut 8 to permit adjusting of the tension of the spring.

The lock nut 8 is provided with a flange 14 forming a shoulder 15, this flange being shown as hexagonal in form and of outside dimensions coinciding with the standard dimensions of a hexagonal nut. This nut is castellated as described in my aforesaid application for the passage of the cotter pin 9, which passes through suitable openings in the bolt. However, the shoulder is of greater depth than that shown in my aforesaid application and is provided with an annular groove 16. This groove may be readily formed with a suitable grooving tool and as plainly shown, is concentric with the bolt upon which the nut is threaded. Intercepting the groove are a plurality of recesses 17 extending inwardly from the periphery of the flange and co-operating with the groove to form a plurality of means for engagement with the hooked end 13 of the spring and for securing this hooked end in position. It will be noted that because the groove is annular and concentric with the bolt, the hooked end, when it is placed in the groove, will not be twisted laterally out of its normal shape, nor will it have to be twisted out of shape particularly laterally in order to place it in position. After the hooked end is seated in the groove, it cannot be displaced laterally until it has been moved circumferentially the full length of the hook. This arrangement is a distinct improvement over other arrangements known to me and wherein oftentimes a movement of the hook for only a portion of its length will permit it to be displaced. Obviously my arrangement results in a greater degree of safety against accidental displacement. Again it will be seen that the hooked end of the spring bears squarely against the edge of the recess in which it is engaged, thus avoiding any tendency of twisting thereof.

Figure 2:
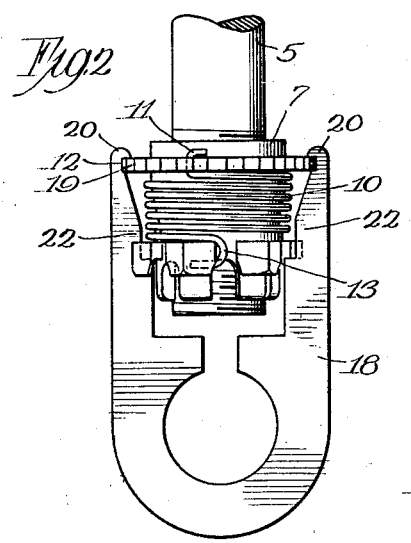
Fig. 2 is an enlarged view showing the take-up device in position on a bolt together with a key, which may be employed therewith.
Figure 4:
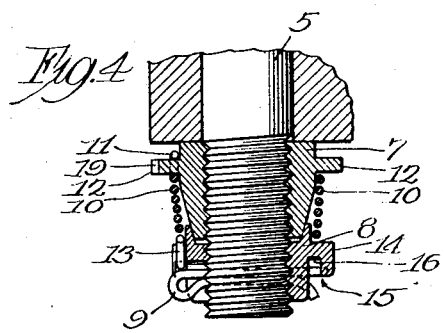
Fig. 4 is a section on the line 4—4 of Fig. 3.
Figure 3:
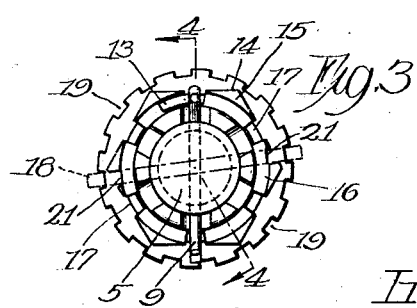
Fig. 3 is an end view of the device after its application to the bolt, the position of the key being shown in dotted lines.

In Figs. 2 and 3 I have shown a key 18 of the form shown in my aforesaid co-pending application, which is adapted to engage both the main nut and lock nut to prevent relative rotation therebetween and to maintain the spring 12 at its proper tension until the device is placed in position upon the bolt where it is to be used. To furnish means for engagement with the key I provide the periphery of the flange 12 of the main nut 7 with a plurality of notches 19. These notches are all of the same depth and form and are arranged in pairs, the notches in each pair being diametrically opposed to each other, for engagement with the opposite hooks 20 on the legs of the key 18. The lock nut 8 is provided on its flange 14 with a single pair of oppositely disposed notches 21 adapted to engage the intermediate portions 22 on the key, and thus prevent relative rotation between the two nuts. It is obvious that this arrangement provides for tensioning the spring to the desired amount and then securing the parts in position by means of the key, as set forth in my aforesaid co-pending application.

In operation the device may be assembled with the key as described above and then sold as a unit, or it may be used without the key, if so desired. In practice I find it desirable to use the key with devices used on small sized bolts, where it is difficult to get at the device when in position on the bolt, whereas the key may be omitted with the larger sizes of bolts, if desired. This is largely a question of judgment or taste with the indiviudal. In either case the end 11 of the spring is secured to the flange 12 of the main nut and the hooked end 13 is secured in one of the recesses 17 of the lock nut and in the annular groove which these recesses intercept, the spring being placed under desired tension, this being done before placing the device on the bolt, if the key is to be used, or being done upon the bolt, if the key is not used.

From the above it will be apparent that I have provided a novel and improved take-up device which will permit ready adjustment of the spring and which shall securely hold the spring against accidental displacement and without twisting it either when it is in place or when it is being put in place. At the same time the device is one which is easily manufactured with known tools and methods and which is rugged in character. Moreover, the size of the lock nut is kept within the dimensions of a standard nut so as to avoid any cutting down of the clearance between the take-up device and the wall of the crank casing 4 of an automobile. The present tendency in automobile construction is to economize space to the greatest extent and therefore clearances are cut down to as small an amount as possible. Therefore, it is of prime importance to provide a device, which shall keep within standard dimensions so as to avoid cutting down clearances any further. While I have shown and described my take-up device as employed in a particular location in an automobile engine, it is nevertheless to be understood that it is by no means restricted to such use, but may be employed in other positions and other mechanisms where found applicable.

I am aware that changes in the form, construction and arrangement of parts may be made without departing from the spirit and without sacrificing the advantages of the invention and I reserve the right to make all such changes as fairly fall within the scope of the following claims.

I claim:

1. A take-up device comprising a locknut, a shoulder on said lock nut, said shoulder having an annular groove therein, and having a plurality of recesses intercepting said groove.

2. A take-up device comprising a main nut, a lock-nut, a shoulder on said lock nut, said shoulder having an annular groove and having a plurality of recesses intercepting said groove, a spring having one end secured to said main nut and provided at its other end with a hook adapted to enter one of said recesses and to be received in said groove.

3. A take-up device comprising a main nut, a flange on said main nut, said flange having a plurality of notches all of the same depth and form and arranged in pairs, the notches in each pair being arranged diametrically opposite to each other, a lock nut telescoping with said main nut and having a single pair of oppositely disposed notches adapted to be brought into alignment with any one of the pairs of notches in said main nut, a spring connected to said nuts and adapted to cause relative rotation therebetween, means on said main nut to receive one end of said spring in a certain position, and means on said lock nut to receive the other end of said spring in any one of a plurality of positions.

4. A take-up device comprising a main nut, a flange on said main nut, said flange having a plurality of notches therein all of the same depth and form and arranged in pairs, the notches in each pair being arranged diametrically opposite to each other, a lock nut having a shoulder, said shoulder having a pair of oppositely disposed notches adapted to be brought into alignment with any one of the pairs of notches in said main nut, a spring connected to said nuts and adapted to cause relative rotation therebetween, and means on said main nut to receive one end of said spring in a certain position, the shoulder on said lock nut having an annular groove therein and also having a plurality of recesses intercepting the groove and co-operating therewith to form a plurality of means to receive the other end of said spring.

5. A take-up device comprising a main nut, a flange on said main nut, said flange having a plurality of notches all of the same depth and form and arranged in pairs, the notches in each pair being arranged diametrically opposite to each other, a lock nut telescoping with said main nut and having a single pair of oppositely disposed notches adapted to be brought into alignment with any one of the pairs of notches in said main nut, a spring connected to said nuts and adapted to cause relative rotation therebetween, means on said main nut to receive one end of said spring in a certain position, means on said lock nut to receive the other end of said spring in any one of a plurality of positions, and a key received within the notches in said lock nut and within one of the pairs of notches in said main nut to prevent relative rotation between said nuts and to maintain said spring under tension.

6. A take-up device comprising a main nut, a flange on said main nut, said flange having a plurality of notches therein and arranged in pairs, the notches in each pair being arranged diametrically opposite to each other, a lock nut having a shoulder, said shoulder having a pair of oppositely disposed notches adapted to be brought into alignment with any one of the pairs of notches in said main nut, a spring connected to said nuts and adapted to cause relative rotation therebetween, means on said main nut to receive one end of said spring in a certain position, the shoulder on said lock nut having an annular groove therein and also having a plurality of recesses intercepting the groove and co-operating therewith to form a plurality of means to receive the other end of said spring, and a key received within the notches in said lock nut and within one of the pairs of notches in said main nut to prevent relative rotation between said nuts and to maintain said spring under tension.

7. A take-up device, comprising a main nut, a lock nut having a plurality of castellations to receive a pin for locking said nut to a bolt, a shoulder on said lock nut, said shoulder having an annular groove and having a plurality of recesses intercepting said groove, a spring having one end secured to said main nut and provided at its other end with a hook adapted to enter one of said recesses and to be received in said groove.

STEPHEN A. SLAUSON.